April 20, 1965   K. L. ZIMMERMAN   3,178,729
TANK BALLS
Original Filed July 6, 1960

INVENTOR
Karl L. Zimmerman
BY
Synnestvedt & Lechner
ATTORNEY

United States Patent Office 3,178,729
Patented Apr. 20, 1965

3,178,729
TANK BALLS
Karl L. Zimmerman, Philadelphia, Pa., assignor to Woodward Wanger Company, Philadelphia, Pa., a corporation of Pennsylvania
Continuation of application Ser. No. 41,206, July 6, 1960. This application Aug. 7, 1962, Ser. No. 215,453
3 Claims. (Cl. 4—56)

This invention relates to improvements in flexible, buoyant valves for use in flush tanks and the like. The type of valve of the kind in question is commonly called a "tank ball" and will be referred to as such hereinafter.

The principal object of the invention is to provide a tank ball having maximum seating or sealing ability and usable with any of the various standard sizes and types of flush valve seats.

This application is a continuation of my application Serial No. 41,206, filed July 6, 1960, and now abandoned.

Figure 1:
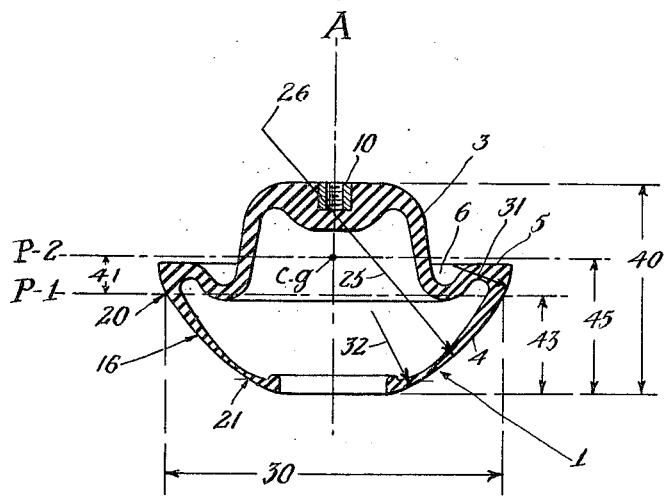
Figure 2:
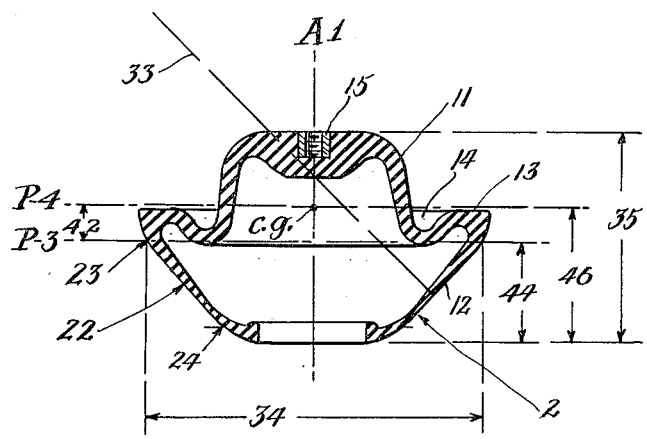

The preferred structure for accomplishing the foregoing will be understood from the following description and drawings wherein:

FIGURE 1 is a cross sectional view of one form of tank ball embodying the invention; and FIGURE 2 is a cross sectional view of another form of tank ball embodying the invention.

In FIGURES 1 and 2 the tank balls 1 and 2 are made from a flexible material such as natural rubber. In FIGURE 1 the tank ball has a hollow upper part 3 and a hollow lower part 4 which are integral with one another and symmetrically disposed about the ball axis A. The joinder area 5 between the upper and lower parts is formed with a channel 6. The top part 3 has a threaded insert 10 by means of which the ball is attached to the tank operating linkage. The tank ball of FIGURE 2 has a hollow top part 11 and a hollow bottom part 12 which are integral with one another and symmetrically disposed about the ball axis A–1. The joinder area 13 has a channel 14 and the top part is provided with a threaded insert 15.

Each of the tank balls 1 and 2 has a surface of revolution which constitutes the seating or sealing area. In the ball 1 the seating area 16 extends around the bottom part 4, the upper limit of which is the terminus indicated by 20 and the lower limit of which is the terminus indicated by 21. In FIGURE 2 the seating area 22 extends around the bottom 12 and the upper limit being at the terminus 23 and the lower limit at the terminus 24.

As will be apparent, the seating area 16 of FIGURE 1 is a curved surface of revolution while the seating area 22 of FIGURE 2 is a plane surface of revolution. The orientation of the sealing area curve (distance between upper and lower termini) is important in obtaining the objectives of the invention, namely, improved sealing characteristics and universality of use. It is important that the length of the radius of the surface be greater than one-half the diameter of the ball taken at the upper terminus and that the center of this radius be located above the upper terminus either on or spaced from the axis A. Preferably the radius should be at least 65% of the diameter taken at the upper seating terminus.

For example, in FIGURE 1 the curve of the surface 16 has a radius 25, the center 26 of which is spaced from the axis A. The length of the radius is greater than one-half the diameter 30 taken at the upper terminus 20 of the seating area.

By locating the center of the radius as mentioned the slope of the curve can be flatter and more nearly normal to the axis of the ball. This minimizes the axial length of the ball while at the same time providing maximum diameters for the seating area. This structure has particular advantage in adapting the ball for use and those instances where allowable ball travel (distance lifted off the seat) is restricted, for example, in the modern type minimum height flush tanks. Furthermore, the curve orientation and particularly the larger diameters permit the tank ball to be used with all standard sizes of tank seats. Another advantage is that the seating area is oriented so that it is particularly suitable for use with the recently introduced "China" flush valve seats.

It is to be observed in FIGURE 1 that the portions of the ball outside the seating area 16 are formed by the radii 31 and 32. It will be understood, of course, that there may be a certain amount of overlapping between the curves formed by the radii 25, 31 and 32 in order to form the entire contour of the lower part 4. With the above in mind, however, it will be understood that essentially the curve of the seating surface 16 is formed by the radius 25.

In FIGURE 2 the radius 33 has its center at infinity and as such the length of the radius is greater than one-half the diameter 34. Also, the center of the radius is spaced from the axis A–1.

Another important factor in the construction of the ball is the relationship between the total length of the ball and the diameter taken at the upper terminus of the seating area. The length of the ball should be between 50% and 70% of the terminus diameter. These limits are a function of the minimum length of the ball (to suit for restricted travel) the maximum and minimum diameters of the seating area in relation to the required volume (particularly in the lower part of the ball) to allow the necessary buoyancy. In FIGURE 1 the length 40 is 60% of the diameter 30. The same relationship pertains between the length 35 and the diameter 34 of the ball of FIGURE 2.

Another important factor is the axial distance between the upper terminus of the seating area and the lower end of the ball with relation to the upper seating area diameter. This axial distance should be between 25% and 33% of the diameter. In FIGURE 1 the distance 43 is 27% (which is the preferred length) of the diameter 30. In FIGURE 2 the distance 44 is 27% of the diameter 34. The above-mentioned lengths are functions of the length and location of the seating curve radius and the length of the diameter at the upper seating terminus.

With the above-described construction the center of gravity of the ball is located very close to the seating area. This has the distinct and important advantage of lending stability to the ball so as to enhance its seating or sealing characteristics. It is preferred that the center of gravity of the ball lie very close to the upper terminus of the seating area or in the plane containing the terminus. For example, in FIGURE 1 the plane P–1 normal to the axis A contains the upper terminus 20 of the seating area. The plane P–2 normal to the axis A contains the center of gravity (C.G.) of the ball. These two planes are separated by the distance 41 which is about 17% of the length 40. In FIGURE 2 the plane P–3 contains the upper terminus 23 and the plane P–4 contains the center of gravity (C.G.) and these two planes are separated by the distance 42 which is about 17% of the length 35.

In connection with the location of the center of gravity, I have found that where the center of gravity does not lie within a plane containing the upper terminus the ratio of the diameter of the upper seating terminus to the length of the ball to distance between the center of gravity and the upper terminus should be between 5 and 12. In FIGURE 1 the ratio of the diameter 30 to the length 40 to the distance 41 is 6. A similar value pertains for the ratio 34/35/42 in FIGURE 2.

The above-mentioned ratio is important because of the interrelation of these dimensions in attaining the objectives of the invention.

I claim:
1. A tank ball comprising:
a hollow, flexible body formed by an upper part and a lower part, the parts being integral with one another and symmetrically arranged with respect to the axis of the ball, the lower part having an external seating area formed by a curved surface of revolution,
the center of the radius of the curve of said surface being located above the upper terminus of the seating area and being spaced from said axis and having a length greater than 65% of the diameter of the ball taken through the upper terminus of the seating area,
the total axial length of the ball including said upper and lower parts being between 50% and 70% of said diameter,
the axial distance between said upper terminus and the lower end of the ball being between 25% and 30% of said diameter,
and the center of gravity of the ball being located on said axis above said upper terminus.

2. A tank ball comprising:
a hollow, flexible body formed by an upper part and a lower part, the parts being integral with one another and symmetrically arranged with respect to the axis of the ball, the lower part having an external seating area formed by a curved surface of revolution,
the center of the radius of the curve of said surface being located above the upper terminus of the seating area and being spaced from said axis and having a length greater than 65% of the diameter of the ball taken through the upper terminus of the seating area,
the total axial length of the ball including said upper and lower parts being 60% of said diameter,
the axial distance between said upper terminus and the lower end of the ball being 27% of said diameter,
and the center of gravity of the ball being located on said axis above said upper terminus.

3. A tank ball comprising:
a hollow, flexible body formed by an upper part and a lower part, the parts being integral with one another and symmetrically arranged with respect to the axis of the ball, the lower part having an external seating area formed by a curved surface of revolution,
the center of the radius of the curve of said surface being located above the upper terminus of the seating area and being spaced from said axis and having a length greater than 65% of the diameter of the ball taken through the upper terminus of the seating area,
the total axial length of the ball including said upper and lower parts being 60% of said diameter,
the axial distance between said upper terminus and the lower end of the ball being 27% of said diameter,
and the center of gravity of the ball being located on said axis above said upper terminus with the axial distance between the center of gravity and the upper terminus being 17% of said total length.

References Cited by the Examiner

UNITED STATES PATENTS

| | | | |
|---|---|---|---|
| 1,592,570 | 7/26 | Shook | 4—57 |
| 1,600,455 | 9/26 | Davis | 4—56 |
| 1,682,306 | 8/28 | Pierson | 4—56 |

EDWARD V. BENHAM, *Primary Examiner.*

FRANK H. BRONAUGH, *Examiner.*